United States Patent [19]

Imel et al.

[11] Patent Number: 5,758,134
[45] Date of Patent: May 26, 1998

[54] MICROPROCESSOR EMBEDDED CONTROL SYSTEM HAVING AN AUTOMATIC CLOCK SLOWDOWN CIRCUIT

[75] Inventors: Michael T. Imel, Beaverton; Bohdan Y. Tashchuk, Lake Oswego, both of Oreg.

[73] Assignee: RadiSys Corporation, Hillsboro, Oreg.

[21] Appl. No.: 711,721

[22] Filed: Sep. 4, 1996

[51] Int. Cl.⁶ .................................. G06F 1/04; G06F 1/12
[52] U.S. Cl. ........................... 395/556; 395/551; 395/558
[58] Field of Search ................................ 395/651, 551, 395/553, 555, 556, 558, 559, 182.21

[56] References Cited

U.S. PATENT DOCUMENTS

| | | | |
|---|---|---|---|
| 4,686,386 | 8/1987 | Tadao | 307/269 |
| 5,019,996 | 5/1991 | Lee | 364/483 |
| 5,109,506 | 4/1992 | Begun | 395/182.21 |
| 5,231,313 | 7/1993 | Itoh | 307/480 |
| 5,294,894 | 3/1994 | Gebara | 331/1 A |
| 5,454,114 | 9/1995 | Yach et al. | 395/750 |
| 5,513,358 | 4/1996 | Lundberg et al. | 395/750 |

*Primary Examiner*—Dennis M. Butler
*Attorney, Agent, or Firm*—Stoel Rives LLP

[57] ABSTRACT

An embedded microprocessor control system temporarily slows a microprocessor clock input signal in response to a reset strobe. This permits the peripherals to synchronize the classification of their clock phases with 386 microprocessor clock phase classifications.

10 Claims, 2 Drawing Sheets

MICROPROCESSOR EMBEDDED CONTROL SYSTEM HAVING AN AUTOMATIC CLOCK SLOWDOWN CIRCUIT

TECHNICAL FIELD

The present invention is related to a microprocessor embedded control system. More specifically, it is related to a microprocessor embedded control system that temporarily sends a less than full speed clock frequency to the microprocessor as a step in the process of initiating full speed microprocessor operation.

BACKGROUND OF THE INVENTION

Society has found many uses for microprocessors. They are not only widely used in personal computers, but they may also be embedded in a system that acts as a controller for many different types of machines.

The various types of Intel 80386® microprocessors constitute one popular family of microprocessors. Various companies produce microprocessors that are "plug compatible" to the Intel 80386®. This means that although the inner workings of such a microprocessor are different, when it and an Intel 80386® are subjected to the same sequence of electrical stimuli on their input pins, both microprocessors produce the same sequence of output signals. Any microprocessor of the class that includes the Intel 80386® and those microprocessors that are plug compatible to the Intel 80386® is referred to here as "a 386 microprocessor" or simply "a 386" in conformity with standard industry usage.

It is typical for a microprocessor to be used to control a suite of peripheral devices or "peripherals." The present patent application addresses problems encountered by peripherals that communicate directly with the microprocessor via a "local" or a "microprocessor" bus. The term "peripheral," as used in the present application, refers to this type of device. It is also typical for a microprocessor to control or direct circuitry that in turn controls additional peripheral devices, but such devices are not addressed in this application.

To be used effectively, a 386 microprocessor must be configured with other circuitry that produces crucial input signals for the 386 microprocessor. For example, the 386 microprocessor requires that an externally created clock signal be delivered to one of its pins (the "clock input pin"). The 386 microprocessor executes instructions at a rate equal to the frequency of this external clock signal and is generally designed to be able to utilize, at maximum, a clock input signal with a frequency of greater than 65 Mhz. Typically, the external clock device produces a square wave signal with a frequency at substantially the full speed rate of the 386 microprocessor.

The 386 microprocessor classifies each cycle of the input clock signal as belonging to one of two alternating phases, named "PH1" and "PH2." The peripherals must send bus control signals and data to the 386 microprocessor in accordance with a timing scheme defined by these phases. Therefore, the peripheral devices must be synchronized to the phase classifications made by the 386 microprocessor.

During power-up, the support circuitry initiates a reset strobe that is received on a 386 microprocessor dedicated input pin and elsewhere, including at the dedicated input pin of each peripheral device. When it is determined that power is stabilized or "good," the reset strobe is deasserted. Classification of these phases of the clock cycle is made in accordance with the timing relationship between the "reset" strobe deassertion and the clock signal. The clock cycle in which the reset strobe falling edge occurs is defined as a "PH2" cycle. Every cycle that follows this first PH2 cycle and is separated from it by an odd number of intervening cycles is also defined as a PH2 cycle. Other following cycles are defined as PH1 cycles. The reset strobe and clock signal sent to the 386 microprocessor are also sent to all of the peripherals, theoretically allowing each peripheral to place itself in agreement with the 386 microprocessor clock cycle phase classification.

Unfortunately, when the clock input to the 386 microprocessor and the peripherals is set to run at a frequency of greater than 65 MHz, this control system encounters a problem. As noted, the reset strobe falling edge designates the PH2 phase. This falling edge is triggered by a "power good" signal, which is supplied by an external device such as a linear chip or a simple capacitor and resistor circuit and is synchronized with the clock rising edge. The reset strobe falling edge must reach each peripheral at least a few nanoseconds before the next clock rising edge to be recognized with certainty during the correct clock cycle at each peripheral.

If the reset strobe falling edge is not recognized during the correct clock cycle at a peripheral, that peripheral defines its phase types in a manner reverse to the definitions formed by the microprocessor and communications between that peripheral and the microprocessor will be destroyed. A host of factors, however, including temperature and different routes to the peripherals, makes it possible that for some peripherals under some conditions the reset strobe falling edge will reach the peripheral too late to be recognized during the correct clock cycle.

Typically, a peripheral is designed to use the reset strobe to define the PH2 clock cycle. When the reset strobe reaches the peripheral only a few nanoseconds before the external clock transition, however, this phase designation may be opposite to the phase designation made by the 386 microprocessor, thereby destroying communications.

SUMMARY OF THE INVENTION

It is, therefore, an object of the present invention to provide a microprocessor embedded control system with an improved certainty in the synchronization of the timing of the peripherals with that of the microprocessor.

The present invention comprises a microprocessor embedded control system having a clock device and peripherals which, in the ideal, designate a pair of alternating clock phases in conformity with a designation assigned by the microprocessor. This designation is synchronized by the deassertion of a reset strobe which is issued by the system. The control system is characterized by a circuit that is interposed between the clock device and the microprocessor and that derives, from the clock signal, a signal with a frequency that is slower than that of the clock signal frequency. The circuit temporarily sends the derived signal to the clock input pin of the microprocessor and to the clock input pins of the peripherals during a reset strobe and momentarily after its deassertion, thereby allowing the peripherals to synchronize with the microprocessor internal clock phase with an enhanced certainty.

Additional objects and advantages of this invention will be apparent from the following detailed description of a preferred embodiment thereof, which proceeds with reference to the accompanying drawings.

DETAILED DESCRIPTION OF A PREFERRED EMBODIMENT

Figure 1:
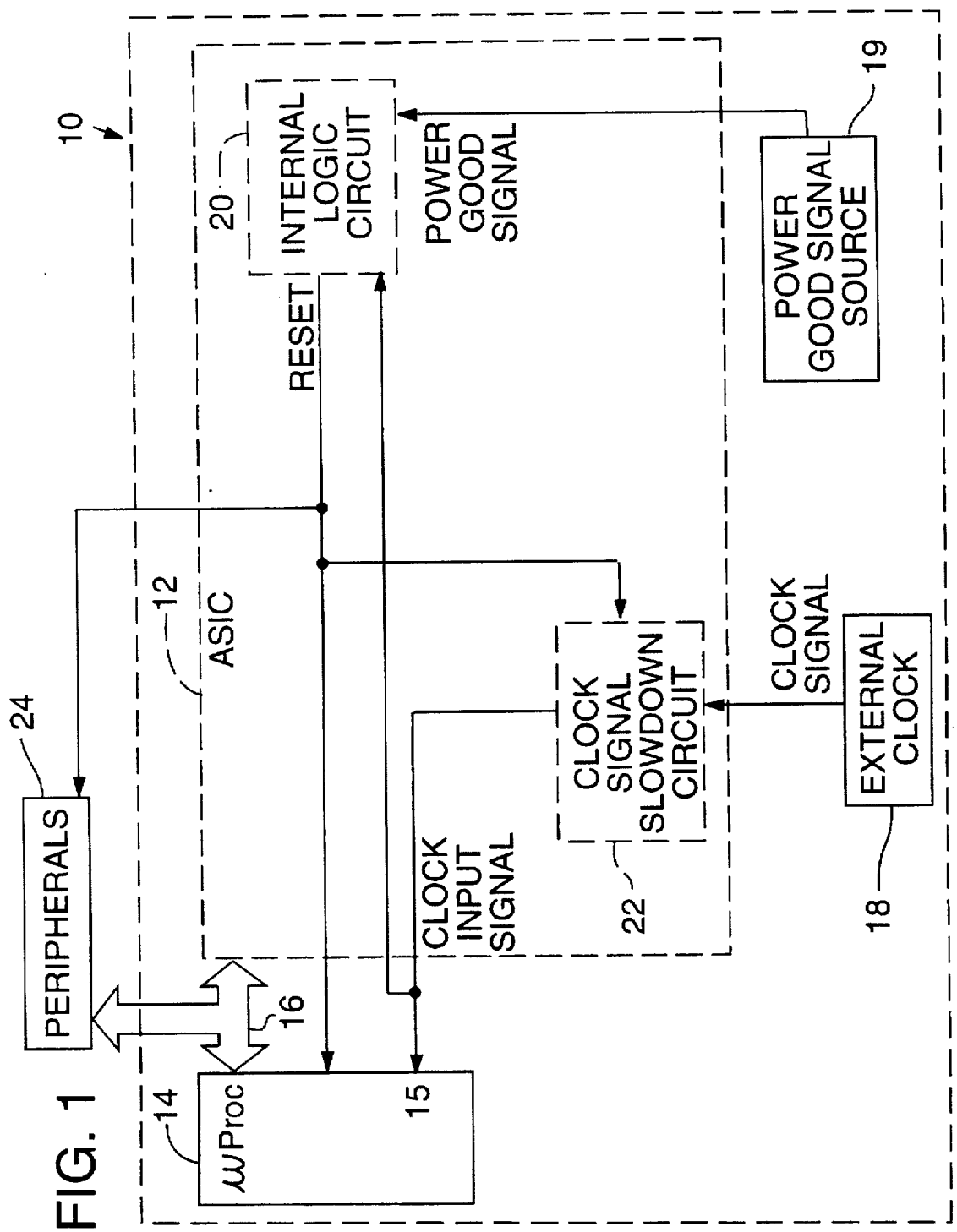
FIG. 1 is a block diagram of an embedded microprocessor control system according to the resent invention.

Referring to FIG. 1, a microprocessor embedded control circuit 10 includes an application specific integrated circuit (ASIC) 12 that communicates with a 386 microprocessor 14, having a clock input pin 15, by way of a microprocessor bus 16. An external clock device 18 produces at its output a clock signal that is applied to ASIC 12, which, in turn, provides a clock input signal to pin 15.

A power good signal source 19 determines when the power to circuit 10 is switched on and stable. When this condition occurs, source 19 sends a "power good" signal to ASIC 12 internal logic circuit 20. Internal logic circuit 20 in turn issues a reset strobe. The falling edge of the reset strobe is synchronized with the rising edge of the clock input signal that is sent from ASIC 12 to clock input pin 15. As shown in FIG. 1, the electrically conductive line that electrically connects ASIC 12 and clock input pin 15 also connects to internal logic circuit 20.

A set of peripherals communicates with ASIC 12 and 386 microprocessor 14 by way of bus 16. To permit peripherals 24 to synchronize the designation of a pair of clock phases with the designations assigned by 386 microprocessor 14, the present invention provides a clock signal slowdown circuit 22, which is resident on ASIC 12. Circuit 22 derives from the external clock signal a clock signal that is slower than the external clock signal by a factor of four. This signal is sent to pin 15 and to peripherals 24.

The 386 microprocessor defines the clock cycle in which the reset strobe falling edge occurs as the PH2 clock phase. All subsequent phases are defined as alternating between a PH1 clock phase and the PH2 clock phase. Peripherals 24 should initiate communications exclusively during a predetermined clock phase. The 386 microprocessor 14 and peripherals 24 use the reset strobe falling edge to synchronize the designation of the clock phases. If the external clock signal was used for this purpose, it is likely that for some peripherals the reset strobe falling edge would arrive only a few nanoseconds or less before a clock rising edge. When this happens, it is typical for the falling edge to fail to register until the next clock cycle, causing a clock phase misdesignation and destroying communications between the microprocessor and the peripheral.

Peripherals 24 receive the same clock signal as does 386 microprocessor 14. This slowed clock signal, sent to 386 microprocessor 14 and peripherals 24 during a reset strobe and momentarily after its deassertion, permits peripherals 24 to synchronize their phase designation with that of the 386 microprocessor 14 with a greater certainty.

Figure 2:
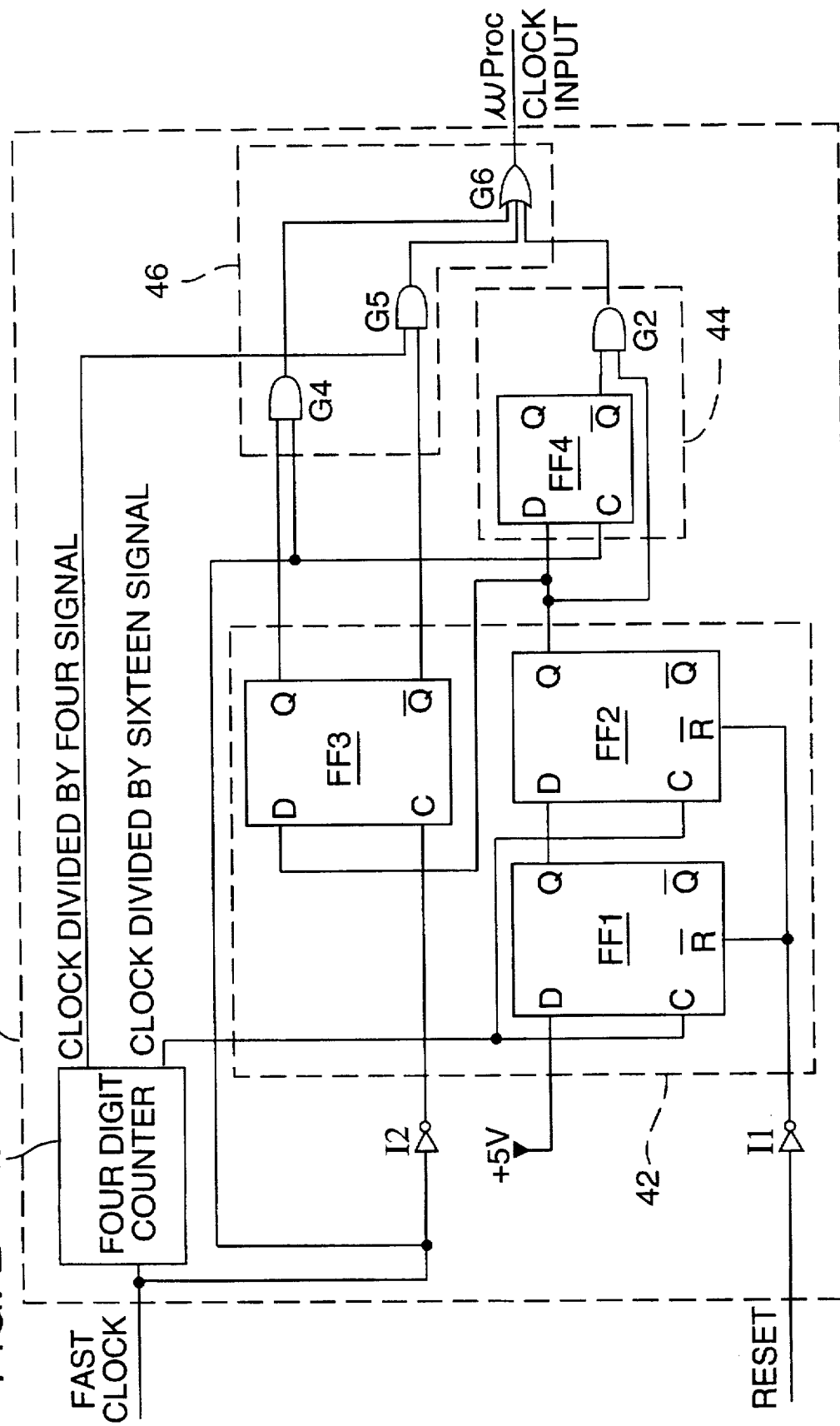
FIG. 2 is a logic circuit diagram of a portion of the embedded microprocessor control device of FIG. 1.

FIG. 2 is a schematic diagram of clock signal slowdown circuit 22. Circuit 22 is divided into the following four subcircuits: a four-digit counter 40, a reset time-out subcircuit 42, a change detection subcircuit 44, and an output logic subcircuit 46.

In discussing FIG. 2, the following definitions apply. Any particular "line," "output," or "input" in a logic circuit may be "high," which indicates a potential of about 3 to 5 volts relative to ground, a true condition, or, stated in an alternative manner, a "one." Alternatively, a "line," "output," or "input" may be "low," which indicates a potential of 0 volts relative to ground; a false condition; or a "zero." The terms "goes low" and "falling edge transition" indicate a transition from a "high" to a "low," and the terms "goes high" and "rising edge transition" indicate the reverse event.

A four-digit counter 40 emits a clock divided-by-four signal and a clock divided-by-16 signal. The clock divided-by-16 signal is used as the clock input for two flip-flops FF1 and FF2 of a reset time-out subcircuit 42. Subcircuit 42 is configured so that the Q output of flip-flop FF2 stays high except that it goes low at the initiation of a reset strobe and stays low for between 16 and 32 clock cycles following the deassertion of a reset strobe. This is so because the D input of flip-flop FF1 is tied high to 5 volts and the inverted reset inputs of both flip-flop FF1 and flip-flop FF2 are connected with a reset line that has been inverted by inverter 11. This, in turn, causes the derived divided-by-four clock signal to be emitted from circuit 22, thereby permitting peripherals 24 (FIG. 1) to synchronize their clock phases with 386 microprocessor 14 (FIG. 1).

In greater detail, because the D input to FF1 is tied high, the Q output of FF1 goes high with the first rising edge of the divided-by-16 clock signal, that occurs after the deassertion of a reset strobe. After the strobe deassertion, the next divided-by-16 clock signal causes the Q output of flip-flop FF2 to go high, signaling that circuit 22 is to resume the external clock signal to pin 15 (FIG. 1).

A flip-flop FF3 delays the switch to the external clock signal by an additional one-half external clock cycle by accepting the inverted (by way of an inverter 12) external clock signal as the flip-flop FF3 clock input and the flip-flop FF2 Q output as the flip-flop FF3 D input. The flip-flop FF3 Q output is an input to an AND Gate G4 in an output logic subcircuit 46. The external clock signal is the other input to AND Gate G4. Therefore, the Q output of flip-flop FF3 must go high for the external clock signal to be emitted from AND Gate G4 and, as will be shown, from circuit 22.

The Q output of flip-flop FF2 are connected with a change detection subcircuit 44. Subcircuit 44 includes a fourth flip-flop FF4 together with an AND Gate G2. Because the Q output of flip-flop FF2 is sent to the D input of a flip-flop FF4, which is driven by the external clock, the Q output of flip-flop FF2 will be the same as the $\bar{Q}$ output of FF4 for only one external clock cycle after the Q output of flip-flop FF2 has changed. AND Gate G2 detects this condition.

This condition indicates that two divided-by-16 clock pulses have issued from four-digit counter 40 since the most recent reset strobe was deasserted by circuit 22 (FIG. 1). At this point circuit 22 resumes issuing the external clock signal to clock input pin 15 and peripherals 24 (FIG. 1). During the transitional period when the output of AND Gate G2 is frozen high, the clock input signal that is transmitted from circuit 22 to clock input pin 15 is frozen high so that there is no possibility that an overly short pulse, known as a "glitch," will be transmitted to pin 15. Output logic subcircuit, described below, performs this function.

An output logic subcircuit 46 includes an OR Gate G6, the output of which is sent to clock input pin 15. For the output of OR Gate G6 to be zero, all three of the input lines to OR Gate G6 must be zero. Therefore, a one on any of the input lines is sufficient to block a time varying signal on any of the other input lines. When the output of AND Gate G2, for example, goes high, indicating that the output of circuit 22 is set to change, this causes the output of OR Gate G6 to be frozen high without regard to its other inputs and prevents the output of a pulse (known as a "glitch") so narrow that it would confuse 386 microprocessor 14. Without this protection, circuit 22 could issue a glitch while transitioning between output signals.

An AND Gate G5 emits a clock-divided-by-four signal when the $\bar{Q}$ output of flip-flop FF3 is high. Otherwise AND Gate G5 emits a constant zero. As noted earlier, AND Gate G4 emits a external clock signal when the Q output of flip-flop FF3 is high. Otherwise AND Gate G4 emits a constant zero. Therefore, either the external clock or the divided-by-four clock, but not both, is delivered to an input of OR Gate G6, which usually transmits one of the two clock signals to 386 microprocessor clock input pin 15. When the output of OR Gate G3 is high, however, the output of OR Gate G6 is frozen high.

Skilled persons will recognize that the logic embodied in the device of FIG. 2 may be implemented in many different forms; that is, a skilled logic designer could readily translate circuit 22 into a different collection of components with an identical input to output logic. The individual user may use whatever form he or she finds most appropriate to implement.

It will be obvious to those having skill in the art that many changes may be made to the details of the above-described embodiment of this invention without departing from the underlying principles thereof. The scope of the present invention should, therefore, be determined only by the following claims.

We claim:

1. An electrical system including an embedded microprocessor and peripherals, each one having a clock input pin, said microprocessor executing instructions at a speed dictated by a signal frequency received at said microprocessor clock input pin, a first portion of said system issuing a reset strobe in response to predetermined stimuli and a second portion of said system producing a first clock signal having a first frequency of substantially the maximum that said microprocessor can utilize, said microprocessor and said peripherals defining a pair of alternating clock phases by the timing of said reset strobe, said definition being possibly inconsistent when said first frequency is used, said system further including:

a circuit which derives, from said first clock signal, a second clock signal having a slower frequency than said first clock signal and which temporarily switches said second clock signal into electrical connection to all said clock input pins during said reset strobe, said electrical connection continuing momentarily after the deassertion of said reset strobe, thereby permitting the consistent definition of clock phases.

2. The system of claim 1 further including anti-glitch circuitry which prevents said switching to said second clock signal from resulting in the transmission of a glitch into said clock input pin.

3. The system of claim 1 in which said microprocessor is a 386 microprocessor device.

4. The system of claim 1 in which said second clock signal is slower than said first clock signal by a factor of a predetermined power of two.

5. The system of claim 1 in which said second clock signal is slower than said first clock signal by a factor of four.

6. In an electrical system including an embedded microprocessor and peripherals, each one having a clock input pin, said microprocessor executing instructions at a rate set by a signal frequency sent to each said clock input pin, said system deasserting a reset strobe to indicate when a first clock signal having a frequency of substantially the maximum said microprocessor can utilize is to be applied to said microprocessor clock input pin and further using said reset strobe to define a pair of alternative clock phases and wherein communication between said microprocessor and each said peripheral is dependent upon each defining said phases in the same way, a method for ensuring the consistent definition of said clock phases including the step of:

providing a circuit which temporarily and synchronously reduces the frequency of the signal sent to said clock input pins to a slower frequency during said reset strobe and momentarily after the deassertion of said reset strobe.

7. The method of claim 6 in which said circuit further including anti-glitch circuitry which prevents said switching to said second clock signal from resulting in the transmission of a glitch into said clock input pin.

8. The method of claim 6 in which said microprocessor is a 386 microprocessor device.

9. The method of claim 6 in which said second clock signal is slower than said first clock signal by a factor of a predetermined power of two.

10. The method of claim 6 in which said second clock signal is slower than said first clock signal by a factor of four.

* * * * *